United States Patent [19]
Bhanot

[11] Patent Number: 5,954,045
[45] Date of Patent: Sep. 21, 1999

[54] GAS APPLIANCE SAFETY SHUT-OFF SYSTEM

[76] Inventor: Raman R. Bhanot, 820 East 19th Ave. #6, San Mateo, Calif. 94403-1437

[21] Appl. No.: 09/084,734

[22] Filed: May 26, 1998

[51] Int. Cl.[6] .................. F24C 3/12; F16K 1/22
[52] U.S. Cl. .................. 126/52; 126/42; 251/306
[58] Field of Search .................. 126/42, 52; 431/280; 251/305, 306, 307, 308, 288; 277/630, 637, 640

[56] References Cited

U.S. PATENT DOCUMENTS

| | | |
|---|---|---|
| 849,121 | 4/1907 | Ge Frorer . |
| 3,029,063 | 4/1962 | Moen . |
| 3,498,584 | 3/1970 | Bowers . |
| 3,902,697 | 9/1975 | Robinson ................. 251/306 |
| 3,958,314 | 5/1976 | Kurkjian, Jr. ............. 251/306 |
| 4,093,178 | 6/1978 | Hughes ................... 251/306 |
| 4,103,866 | 8/1978 | Robinson ................. 251/305 |
| 4,398,695 | 8/1983 | Torche . |
| 4,429,705 | 2/1984 | Ritchart . |
| 4,491,142 | 1/1985 | Shimizu . |
| 4,832,070 | 5/1989 | James et al. . |
| 4,844,115 | 7/1989 | Bowers . |
| 4,995,415 | 2/1991 | Weber . |
| 5,094,259 | 3/1992 | Hsu . |
| 5,280,802 | 1/1994 | Comuzie, Jr. ............. 137/65 |
| 5,400,766 | 3/1995 | Dillon ..................... 126/42 |
| 5,694,916 | 12/1997 | Gambill et al. ............ 126/42 |

*Primary Examiner*—James C. Yeung
*Assistant Examiner*—Sara Raab

[57] ABSTRACT

A new gas appliance safety shut-off system for preventing accidents and deaths related to the utilization of gas-fueled appliances by providing a gas-fueled appliance with an integrated valve. The operating handle of the valve is accessible from the front of the appliance housing so that the gas supply to the burning devices on or in the appliance may be turned off quickly and easily. The inventive device includes a hydrocarbon gas-fueled appliance that has a gas supply line located in the external housing of the appliance and at least one burning device. An internal pipe member is fluidly connected to the gas supply line such that all hydrocarbon gas burned by the burning devices of the appliance must pass through the pipe member. A valve is pivotally secured in the lumen of the pipe member to selectively cut off the supply of hydrocarbon gas to all the burning devices of the appliance. An operating handle is secured to the valve to allow manual manipulation of the movement of the valve within the lumen of the pipe member. The operating handle is mounted on the exterior of the housing adjacent to a control panel of the housing on the front of the housing of the appliance such that the hydrocarbon gas supplied to all the burning devices of the appliance may be easily and quickly shut-off by turning the operating handle.

8 Claims, 3 Drawing Sheets

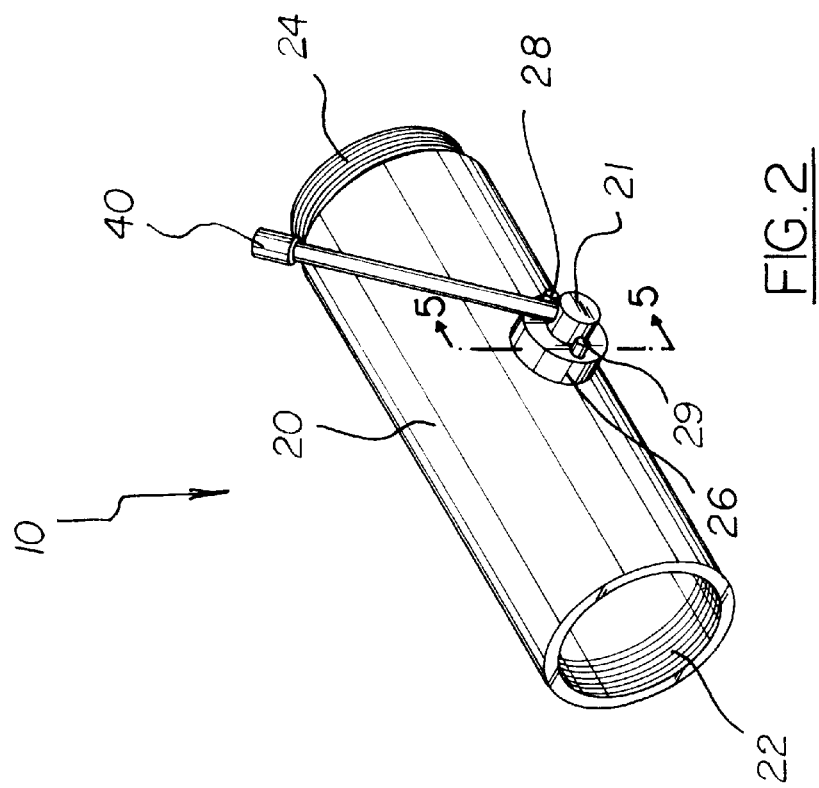
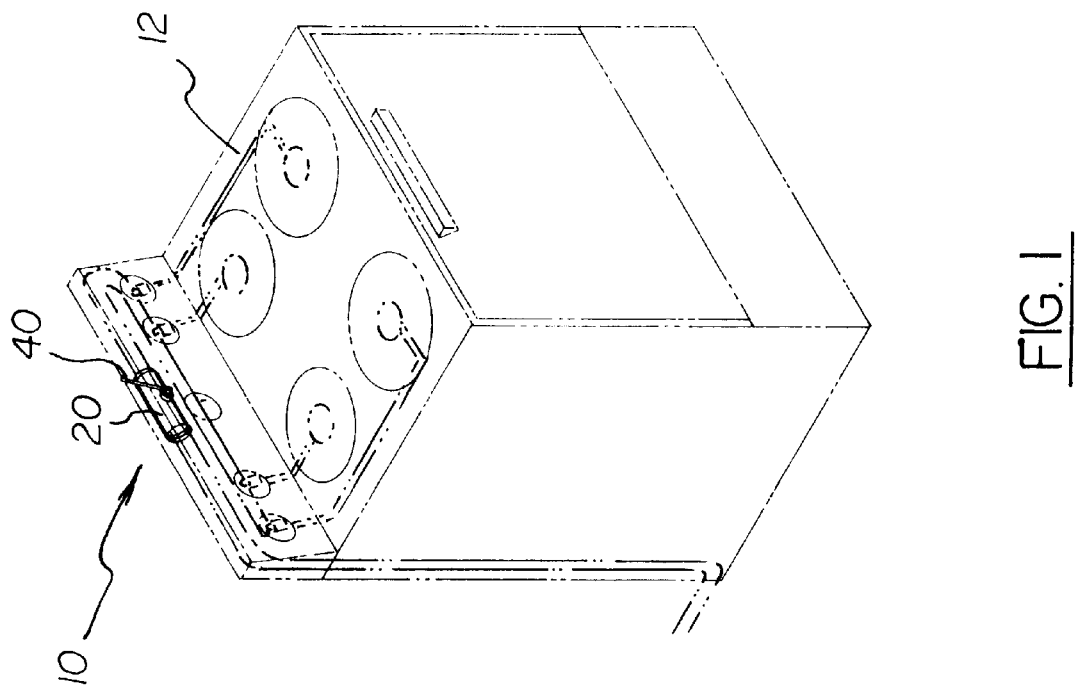
FIG. 2
FIG. 1

GAS APPLIANCE SAFETY SHUT-OFF SYSTEM

BACKGROUND OF THE INVENTION

1. Field of the Invention

The present invention relates to gas shut-off devices and more particularly pertains to a new gas appliance safety shut-off system for preventing accidents and deaths related to the utilization of gas-fueled appliances by providing a gas-fueled appliance with an integrated valve. The operating handle of the valve is accessible from the front of the appliance housing so that the gas supply to the burning devices on or in the appliance may be turned off quickly and easily.

2. Description of the Prior Art

The use of gas shut-off devices is known in the prior art. More specifically, gas shut-off devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art gas shut-off devices include U.S. Pat. No. 5,094,259; U.S. Pat. No. 4,491,142; U.S. Pat. No. 5,280,802; U.S. Pat. No. 4,995,415; U.S. Pat. No. 4,832,070, U.S. Pat. No. 4,429,705, U.S. Pat. No. 849,121, U.S. Pat. No. 4,398,695, U.S. Pat. No. 3,029,063, U.S. Pat. No. 3,498,584, and U.S. Pat. No. 4,844,115.

While these devices fulfill their respective, particular objectives and requirements, the aforementioned patents do not disclose a new gas appliance safety shut-off system. The inventive device includes a hydrocarbon gas-fueled appliance that has a gas supply line located in the external housing of the appliance and at least one burning device. An internal pipe member is fluidly connected to the gas supply line such that all hydrocarbon gas burned by the burning devices of the appliance must pass through the pipe member. A valve is pivotally secured in the lumen of the pipe member to selectively cut off the supply of hydrocarbon gas to all the burning devices of the appliance. An operating handle is secured to the valve to allow manual manipulation of the movement of the valve within the lumen of the pipe member. The operating handle is mounted on the exterior of the housing adjacent to a control panel of the housing on the front of the housing of the appliance such that the hydrocarbon gas supplied to all the burning devices of the appliance may be easily and quickly shut-off by turning the operating handle.

In these respects, the gas appliance safety shut-off system according to the present invention substantially departs from the conventional concepts and designs of the prior art, and in so doing provides an apparatus primarily developed for the purpose of preventing accidents and deaths related to the utilization of gas-fueled appliances by providing a gas-fueled appliance with an integrated valve. The operating handle of the valve is accessible from the front of the appliance housing so that the gas supply to the burning devices on or in the appliance may be turned off quickly and easily.

SUMMARY OF THE INVENTION

In view of the foregoing disadvantages inherent in the known types of gas shut-off devices now present in the prior art, the present invention provides a new gas appliance safety shut-off system construction wherein the same can be utilized for preventing accidents and deaths related to the utilization of gas-fueled appliances by providing a gas-fueled appliance with an integrated valve. The operating handle of the valve is accessible from the front of the appliance housing so that the gas supply to the burning devices on or in the appliance may be turned off quickly and easily.

The general purpose of the present invention, which will be described subsequently in greater detail, is to provide a new gas appliance safety shut-off system apparatus and method which has many of the advantages of the gas shut-off devices mentioned heretofore and many novel features that result in a new gas appliance safety shut-off system which is not anticipated, rendered obvious, suggested, or even implied by any of the prior art gas shut-off devices, either alone or in any combination thereof.

To attain this, the present invention generally comprises a hydrocarbon gas-fueled appliance that has a gas supply line located in the external housing of the appliance and at least one burning device. An internal pipe member is fluidly connected to the gas supply line such that all hydrocarbon gas burned by the burning devices of the appliance must pass through the pipe member. A valve is pivotally secured in the lumen of the pipe member to selectively cut off the supply of hydrocarbon gas to all the burning devices of the appliance. An operating handle is secured to the valve to allow manual manipulation of the movement of the valve within the lumen of the pipe member. The operating handle is mounted on the exterior of the housing adjacent to a control panel of the housing on the front of the housing of the appliance such that the hydrocarbon gas supplied to all the burning devices of the appliance may be easily and quickly shut-off by turning the operating handle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gas appliance safety shut-off system apparatus and method which has many of the advantages of the gas shut-off devices mentioned heretofore and many novel features that result in a new gas appliance safety shut-off system which is not anticipated, rendered obvious, suggested, or even implied by any of the prior art gas shut-off devices, either alone or in any combination thereof.

It is another object of the present invention to provide a new gas appliance safety shut-off system which may be easily and efficiently manufactured and marketed.

It is a further object of the present invention to provide a new gas appliance safety shut-off system which is of a durable and reliable construction.

An even further object of the present invention is to provide a new gas appliance safety shut-off system which is susceptible of a low cost of manufacture with regard to both materials and labor, and which accordingly is then susceptible of low prices of sale to the consuming public, thereby making such gas appliance safety shut-off system economically available to the buying public.

Still yet another object of the present invention is to provide a new gas appliance safety shut-off system which provides in the apparatuses and methods of the prior art some of the advantages thereof, while simultaneously overcoming some of the disadvantages normally associated therewith.

Still another object of the present invention is to provide a new gas appliance safety shut-off system for preventing accidents and deaths related to the utilization of gas-fueled appliances by providing a gas-fueled appliance with an integrated valve. The operating handle of the valve is accessible from the front of the appliance housing so that the gas supply to the burning devices on or in the appliance may be turned off quickly and easily.

Yet another object of the present invention is to provide a new gas appliance safety shut-off system which includes a hydrocarbon gas-fueled appliance that has a gas supply line located in the external housing of the appliance and at least one burning device. An internal pipe member is fluidly connected to the gas supply line such that all hydrocarbon gas burned by the burning devices of the appliance must pass through the pipe member. A valve is pivotally secured in the lumen of the pipe member to selectively cut off the supply of hydrocarbon gas to all the burning devices of the appliance. An operating handle is secured to the valve to allow manual manipulation of the movement of the valve within the lumen of the pipe member. The operating handle is mounted on the exterior of the housing adjacent to a control panel of the housing on the front of the housing of the appliance such that the hydrocarbon gas supplied to all the burning devices of the appliance may be easily and quickly shut-off by turning the operating handle.

Still yet another object of the present invention is to provide a new gas appliance safety shut-off system that protects the user from leaks by providing an easily accessible means for shutting off flow of gas to the appliance.

Even still another object of the present invention is to provide a new gas appliance safety shut-off system that increases safety by easy opening and closing after each use of the gas appliance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new gas appliance safety shut-off system according to the present invention secured to the upper portion of a gas appliance.

FIG. 2 is a perspective view of the present invention particularly illustrating the operating handle in relation to the pipe member.

DESCRIPTION OF THE PREFERRED EMBODIMENT

Figure 3:
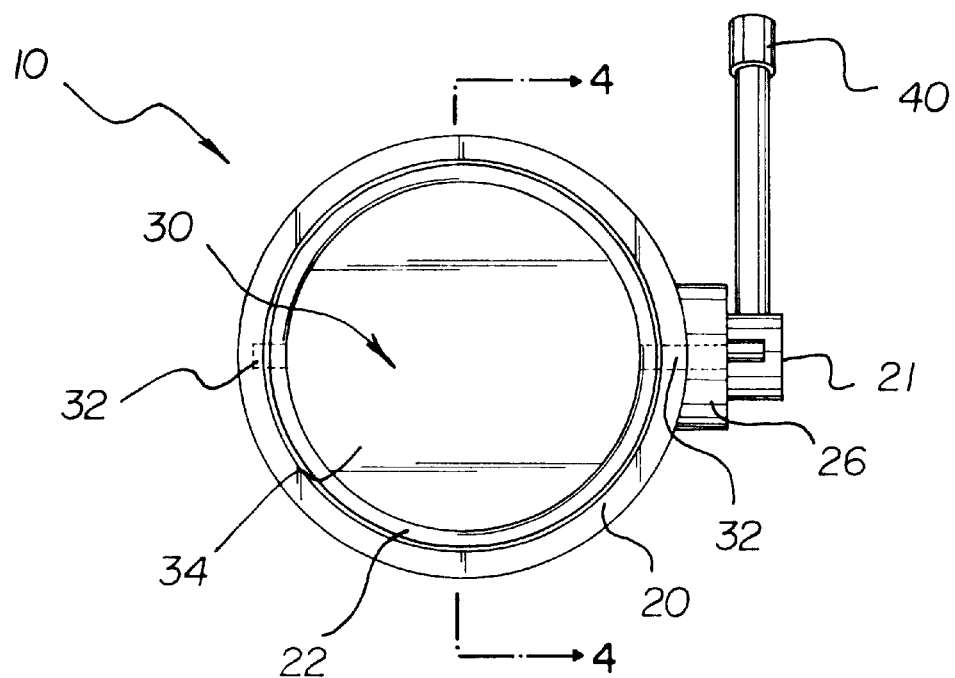
FIG. 3 is an end view of the present invention.

With reference now to the drawings, and in particular to FIGS. 1 through 6 thereof, a new gas appliance safety shut-off system embodying the principles and concepts of the present invention and generally designated by the reference numeral 10 will be described.

As best illustrated in FIGS. 1 through 6, the gas appliance safety shut-off system 10 comprises a hydrocarbon gas-fueled appliance 12 that has a gas supply line 14 located in the external housing 13 of the appliance 12 and at least one burning device 15. An internal pipe member 20 is fluidly connected to the gas supply line 14 such that all hydrocarbon gas burned by the burning devices 15 of the appliance 12 must pass through the pipe member 20. A valve 30 is pivotally secured in the lumen of the pipe member 20 to selectively and simultaneously cut off the supply of hydrocarbon gas to all the burning devices 15 of the appliance 12. An operating handle 40 is secured to the valve 30 to allow manual manipulation of the movement of the valve 30 within the lumen of the pipe member 20. The operating handle 40 is mounted on the exterior of the housing 13 adjacent to a control panel 17 of the housing 13 on the front 16 of the housing 13 of the appliance 12 such that the hydrocarbon gas supplied to all the burning devices 15 of the appliance 12 may be easily and quickly shut-off by turning the single operating handle 40.

The hydrocarbon gas-fueled appliance 12 has an external housing 13. The housing 13 has a front 16 and a rear (not shown), a gas supply line 14 entering the rear of the housing 13, and at least one burning device 15 therein. The housing 13 also has a control panel 17 accessible from the front 16 thereof for controlling the operation of the burning devices 15 by a user of the appliance 12.

An internal pipe member 20 is located in the housing 13 and has a lumen. The internal pipe member 20 is fluidly connected to the gas supply line 14 such that all hydrocarbon gas burned by the burning devices 15 of the appliance 12 must pass through the pipe member 20.

A valve 30 is pivotally secured in the lumen of the pipe member 20 to selectively close the lumen of the pipe member 20 to simultaneously cut off the supply of hydrocarbon gas to all the burning devices 15 of the appliance 12. The valve 30 is located in the housing 13 of the appliance 12 in a portion of the housing 13 adjacent to the control panel 17.

An operating handle 40 is secured to the valve 30 to allow manual manipulation of the movement of the valve 30 within the lumen of the pipe member 20. The operating handle 40 is mounted on the exterior of the housing 13 adjacent the control panel 17 of the housing 13 on the front 16 of the housing 13 of the appliance 12 such that the hydrocarbon gas supplied to all the burning devices 15 of the appliance 12 may be easily and quickly shut-off by turning the operating handle 40. The positioning of the operating handle 40 on the control panel (or closely adjacent thereto) is highly critical for easy access during normal operation and especially in times of emergency such as an uncontrolled fire at one of the burning devices 15. Further, the operating handle's on the control panel 17 provides a quick and clear visual indication of the valve's current position (either closed or open).

Preferably, the valve 30 includes an elongate cylindrical handle support sleeve 26, a cylindrical pivoting member 21, a first handle stop 28, and a second handle stop 29. The handle support sleeve 26 has opposite ends and is secured at the ends of the sleeve 26 to the exterior side of the pipe member 20. The cylindrical handle support sleeve 26 has a passage along its longitudinal axis.

The cylindrical pivoting member 21 is rotatably secured within the passage of the handle support sleeve 26. The operating handle 40 is mounted to the pivoting member 21 in an orientation substantially orthogonal to the longitudinal axis of the handle support sleeve 26.

The first handle stop 28 is secured to the end of the cylindrical handle support sleeve 26 opposite of the pipe member 20 to limit the range of motion of the operating handle 40. The second handle stop 29 is secured to the end of the cylindrical handle support sleeve 26 opposite of the pipe member 20 to limit the motion of the operating handle 40. More preferably, the first operating handle 40 stop corresponds to the open position of the valve 30 and the second operating handle 40 stop corresponds to the closed position of the valve 30. The first and second operating handle 40 stops permit about 90 degrees of rotation of the operating handle 40 between the open and closed positions of the valve 30. Most preferably, the first handle stop 28 and the second handle stop 29 are positioned to allow only a ninety degree rotation of the operating handle 40 between an open position and a closed position of the valve 30.

Also preferably, the valve 30 includes a pivoting shaft 32, a valve plate 34, and a sealing cincture 36. The pivoting shaft 32 is rotatably projecting through the lumen of the pipe member 20 in a direction substantially orthogonal to the length of the pipe member 20.

The valve plate 34 is centrally secured to the pivoting shaft 32 and is adapted to the shape of the lumen. The valve plate 34 includes a boule circular rib 38 along its outer perimeter.

The sealing cincture 36 is secured to the boule circular rib 38 for releasably sealing against the interior surface of the lumen to thereby preventing passage of gas when the sealing cincture 36 is brought into contact with the lumen.

In one embodiment of the present invention, the appliance 12 comprises a gas cooking stove 12 with the burning devices 15 comprising at least three burners 15. The valve 30 controls gas flow to all burners 15 simultaneously. In such an embodiment, the gas cooking stove 12 preferably has a control housing 18 on the top of the housing 13 in a location adjacent to the burners 15. The control panel 17 is preferably mounted on the control housing 18. The valve 30 is located in the control housing 18 and the operating handle 40 is mounted on the control housing 18 In another embodiment of the present invention, the gas appliance 12 safety shut-off system comprises a hydrocarbon gas-fueled stove with at least four burners 15 and an external housing 13. The housing 13 has a front 16, a rear, and a gas supply line entering the rear of the housing 13. The housing 13 also has a control panel 17 accessible from the front 16 thereof for controlling the operation of the burners 15 by a user of the appliance 12.

The stove has a control housing 13 on the top of the housing 13 adjacent to the burners 15. The control panel 17 is mounted on the control housing 13. The valve 30 is located in the control housing 13 and the operating handle 40 is mounted on the control housing 13.

Preferably, the pipe member 20 has ends 22,24 that are adapted to be fluidly coupled to an existing pipe, such as a gas supply line 14 transporting natural gas or propane. Ideally, the pipe member 20 includes a threaded female end 22 and a threaded male end 24 located opposite of the threaded female end 22. A threaded male end 24 and a threaded female end 22 are preferred to provide compatibility with existing threaded pipe and a more secure seal.

Figure 4:
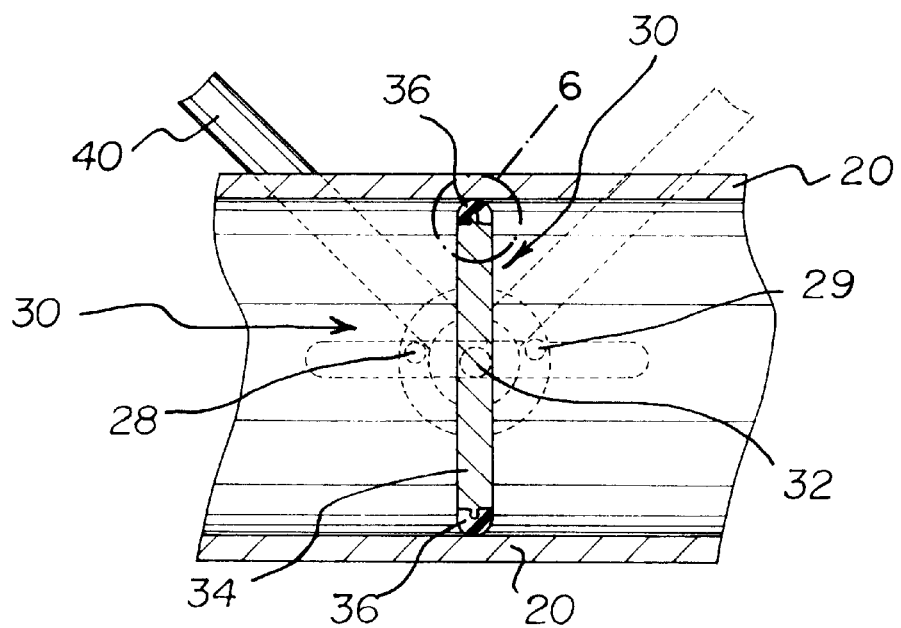
FIG. 4 is a cross-sectional view of the present invention taken along Line 4—4 of FIG. 3.
Figure 6:
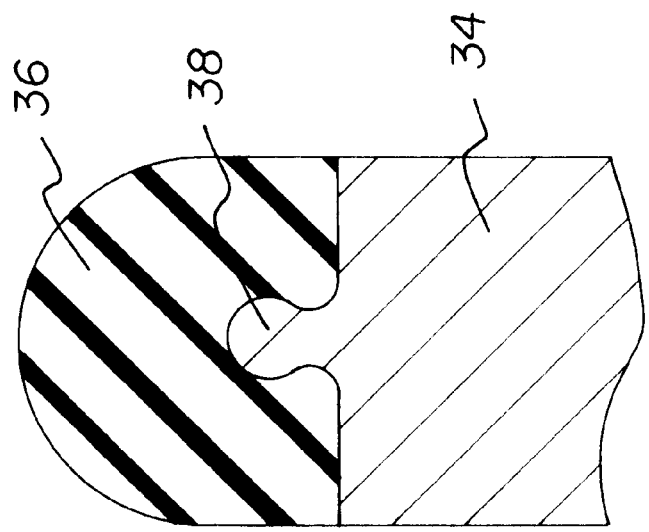
FIG. 6 is a magnified view of the boule circular rib securing the sealing cincture taken from Circle 6 of FIG. 4.
Figure 5:
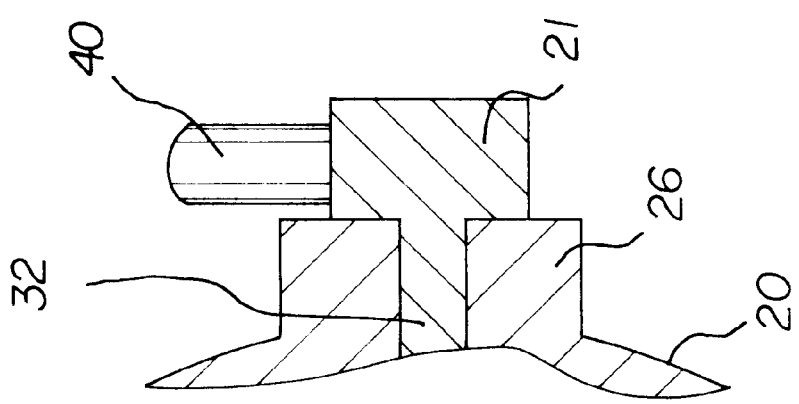
FIG. 5 is a cross-sectional view of the present invention taken along Line 5—5 of FIG. 2.

Ideally, the first handle stop 28 and the second handle stop 29 are positioned to limit the range of motion of the operating handle 40 to only a ninety degree range. As best illustrated by FIGS. 2 and 4, the ninety degree rotation range extends from a first angle oriented at about forty-five degrees to the longitudinal axis of the pipe member 20 and a second angle oriented at about forty-five degrees to the longitudinal axis of the pipe member 20 such that the operating handle 40 extends beyond the pipe member 20 at all points of the ninety degree range of rotation. This permits accessibility to the operating handle 40 at all points along the range of rotation. Such accessibility is desirable in that the operating handle 40 is more readily available to move to close the valve 30 than other types of handles, such as a butterfly-type handle, which could be difficult to grasp quickly and rotate in an emergency situation. Also, if the operating handle 40 were permitted to rotate such that it were substantially parallel to the longitudinal axis of the pipe member 20, fumbling for the operating handle 40 could occur in an emergency situation. Furthermore, limiting the movement of the operating handle 40 as described above provides for improved visual recognition of the open or closed status of the valve 30.

Preferably, the pipe member 20 includes a cylindrical handle support sleeve 26 secured to the exterior side of the pipe member 20. The cylindrical handle support sleeve 26 includes a passage (unnumbered) along the longitudinal axis of the cylindrical handle support sleeve 26.

Also preferably, the pipe member 20 has a cylindrical pivoting member 21 that is rotatably secured within the passage (unnumbered) of the handle support sleeve 26. The operating handle 40 is mounted to the pivoting member 21 in an orientation substantially orthogonal to the longitudinal axis of the handle support sleeve 26.

Ideally, the valve 30 includes a pivoting shaft 32 that rotatably projects through the passage of the handle support sleeve 26 and engages the cylindrical pivoting member 21 The pivoting shaft 32 rotatably engages the opposite interior wall of the lumen of the pipe member 20.

When the operating handle 40 is engaged with the first handle stop 28, the valve 30 is completely closed. In use, the operating handle 40 is rotated until it engages the second handle stop 29 to open the valve 30. The appliance 12 is used as usual. After use of the appliance 12 is complete, the operating handle 40 is rotated until it engages the first handle stop 28, thereby completely closing the valve 30 to prevent the flow of gas in the presence of an undetected leak or to prevent unwanted use, such as by children or by accidentally turning the appliance 12 on or not turning the appliance 12 completely off.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gas appliance safety shut-off system comprising:
   a hydrocarbon gas-fueled appliance having an external housing, said housing having a front and a rear, said housing having a gas supply line entering the rear of said housing and at least one burning device therein, said housing having a control panel accessible from the front thereof for controlling operation of said burning devices by a user of the appliance;
   an internal pipe member located in said housing and having a lumen, said internal pipe member being fluidly connected to said gas supply line such that all hydrocarbon gas burned by the burning devices of said appliance must pass through said pipe member;
   a valve pivotally secured in the lumen of the pipe member for selectively closing the lumen of the pipe member to cut off the supply of hydrocarbon gas to all said burning devices of said appliance, said valve being located in the housing of said appliance in a portion of said housing adjacent to said control panel; and
   an operating handle secured to the valve for allowing manual manipulation of the movement of the valve within the lumen of the pipe member, said operating handle being mounted on the exterior of the housing adjacent to the control panel of said housing on the front of the housing of the appliance such that the hydrocarbon gas supplied to all said burning devices of said appliance may be easily and quickly shut-off by turning said operating handle;
   the valve having a valve plate pivotally disposed in the lumen, the valve plate including a boule circular rib along the perimeter thereof; and
   the valve having a sealing cincture secured to the boule circular rib for releasably sealing against the interior surface of the lumen to thereby preventing passage of gas when said sealing cincture is brought into contact with said lumen.

2. The gas appliance safety shut-off system of claim 1, wherein said valve includes:
   an elongate cylindrical handle support sleeve having opposite ends and being secured at the ends of said sleeve to the exterior side of the pipe member, said cylindrical handle support sleeve having a passage along the longitudinal axis thereof;
   a cylindrical pivoting member rotatably secured within the passage of the handle support sleeve, said operating handle being mounted to said pivoting member in an orientation substantially orthogonal to the longitudinal axis of said handle support sleeve;
   a first handle stop secured to the end of the cylindrical handle support sleeve opposite of the pipe member limiting a range of motion of the operating handle; and
   a second handle stop secured to the end of the cylindrical handle support sleeve opposite of the pipe member limiting the motion of the operating handle.

3. The gas appliance safety shut-off system of claim 2, wherein the first handle stop and the second handle stop are positioned to allow only a ninety degree rotation of the operating handle between an open position and a closed position of said valve.

4. The gas appliance safety shut-off system of claim 1 wherein said appliance comprises a gas cooking stove with said burning devices comprising at least three burners, and wherein said valve controls gas flow to all burners simultaneously.

5. The gas appliance safety shut-off system of claim 4 wherein said gas cooking stove has a control housing on the top of said housing in a location adjacent to said burners, and wherein said control panel is mounted on said control housing.

6. The gas appliance safety shut-off system of claim 1 additionally comprising a first operating handle stop corresponding to the open position of said valve and a second operating handle stop corresponding to the closed position of said valve, said first and second operating handle stops permitting about 90 degrees of rotation of the operating handle between said open and closed positions of said valve.

7. A gas appliance safety shut-off system comprising:
   a hydrocarbon gas-fueled appliance having an external housing, said housing having a front and a rear, said housing having a gas supply line entering the rear of said housing and at least one burning device therein, said housing having a control panel accessible from the front thereof for controlling operation of said burning devices by a user of the appliance;
   an internal pipe member located in said housing and having a lumen, said internal pipe member being fluidly connected to said gas supply line such that all hydrocarbon gas burned by the burning devices of said appliance must pass through said pipe member;
   a valve pivotally secured in the lumen of the pipe member for selectively closing the lumen of the pipe member to cut off the supply of hydrocarbon gas to all said burning devices of said appliance, said valve being located in the housing of said appliance in a portion of said housing adjacent to said control panel;
   an operating handle secured to the valve for allowing manual manipulation of the movement of the valve within the lumen of the pipe member, said operating handle being mounted on the exterior of the housing adjacent to the control panel of said housing on the front of the housing of the appliance such that the hydrocarbon gas supplied to all said burning devices of said appliance may be easily and quickly shut-off by turning said operating handle; and wherein the valve includes:

a pivoting shaft rotatably projecting through the lumen of the pipe member in a direction substantially orthogonal to the length of said pipe member;

a valve plate centrally secured to the pivoting shaft and adapted to a shape of the lumen, the valve plate including a boule circular rib along the perimeter thereof; and a sealing cincture secured to the boule circular rib for releasably sealing against the interior surface of the lumen to thereby preventing passage of gas when said sealing cincture is brought into contact with said lumen.

8. A gas appliance safety shut-off system comprising:

a hydrocarbon gas-fueled stove having at least four burners, said stove having an external housing, said housing having a front and a rear, said housing having a gas supply line entering the rear of said housing, said housing having a control panel accessible from the front thereof for controlling operation of said burners by a user of said appliance, an internal pipe member located in said housing and having a lumen, said internal pipe being fluidly connected to said gas supply line such that all hydrocarbon gas burned by the burning devices of said appliance must pass through said pipe member;

a valve pivotally secured in the lumen of the pipe member for selectively closing the lumen of the pipe member, said valve being located in the housing of said appliance in a portion of said housing adjacent to said control panel; wherein said valve controls hydrocarbon gas flow to all burners of said gas stove simultaneously;

an operating handle secured to the valve for allowing manual manipulation of movement of the valve within the lumen of the pipe member, said operating handle being mounted on the exterior of the housing adjacent to the control panel of said housing on the front of the housing of the appliance such that the hydrocarbon gas supplied to all said burning devices of said appliance may be easily and quickly shut-off by turning said operating handle; and wherein said stove has a control housing on the top of said housing adjacent to said burners, said control panel being mounted on said control housing, and said valve being located in said control housing and said operating handle being mounted on said control housing;

an elongate cylindrical handle support sleeve having opposite ends and being secured at the ends of said sleeve to the exterior side of the pipe member, said cylindrical handle support sleeve having a passage along a longitudinal axis thereof;

a cylindrical pivoting member rotatably secured within the passage of the handle support sleeve, said operating handle being mounted to said pivoting member in an orientation substantially orthogonal to the longitudinal axis of said handle support sleeve;

a first handle stop secured to the end of the cylindrical handle support sleeve opposite of the pipe member limiting a range of motion of the operating handle;

a second handle stop secured to the end of the cylindrical handle support sleeve opposite of the pipe member limiting the motion of the operating handle;

a pivoting shaft rotatably projecting through the lumen of the pipe member in a direction substantially orthogonal to a radial axis of said pipe member;

a valve plate centrally secured to the pivoting shaft and adapted to the shape of the lumen; the valve plate including a boule circular rib along a perimeter edge thereof;

a sealing cincture secured to the boule circular rib for releasably sealing against an interior surface of the lumen to thereby prevent passage of gas when said sealing cincture is brought into contact with said lumen; and wherein the first handle stop and the second handle stop are positioned to allow only about ninety degrees of rotation of the operating handle between an open position and a closed position of said valve.

* * * * *